United States Patent [19]

Lutz

[11] 4,120,812
[45] Oct. 17, 1978

[54] POLYETHYLENE GLYCOL-STABILIZED PEROXYGENS

[75] Inventor: Charles William Lutz, Princeton, N.J.

[73] Assignee: FMC Corporation, Philadelphia, Pa.

[21] Appl. No.: 807,630

[22] Filed: Jun. 17, 1977

[51] Int. Cl.$^2$ .................. C11D 3/395; C11D 7/54; C01B 15/10
[52] U.S. Cl. .................... 252/186; 8/107; 8/111; 252/95; 252/99; 423/274; 423/415 P; 427/221
[58] Field of Search .............. 252/186, 95, 99; 106/308 M; 423/274, 277, 415 P; 427/220, 221; 8/107, 111

[56] References Cited

U.S. PATENT DOCUMENTS

| 3,932,295 | 1/1976 | Fujino et al. | 252/99 |
| 3,979,318 | 9/1976 | Tokiwa et al. | 252/186 |
| 3,984,342 | 10/1976 | Hall et al. | 252/186 |
| 3,992,317 | 11/1976 | Brichard et al. | 427/221 |

Primary Examiner—Benjamin R. Padgett
Assistant Examiner—Irwin Gluck

[57] ABSTRACT

A coated peroxygen compound having improved storage stability, said peroxygen being coated with about 0.1 to about 3.0 weight percent of a polyethylene glycol product having an average molecular weight greater than about 200.

3 Claims, No Drawings

POLYETHYLENE GLYCOL-STABILIZED PEROXYGENS

This invention relates to the preparation of stabilized peroxygen compounds, particularly sodium carbonate peroxide, sodium perborate and mixtures thereof.

Peroxygen compounds have been used commercially as a source of active oxygen in bleaching, detergent, cleaning, rinsing, and scouring formulations. Their effectiveness is believed to result from an oxidative process which decolorizes or removes impurities or foreign matter from the material being treated. Two peroxygen compounds that have been used as a source of active oxygen in these formulations are sodium carbonate peroxide and sodium perborate.

Sodium carbonate peroxide and sodium perborate are crystalline peroxygen compounds having the respective formulas $2Na_2CO_3 \cdot 3H_2O_2$ (theoretical active oxgyen content of 15.28% by weight) and $NaBO_3 \cdot 4H_2O$ (theoretical active oxygen content of 10.38% by weight), which compounds are capable of releasing hydrogen peroxide in aqueous solutions. It is well known that sodium carbonate peroxide may be prepared by reacting hydrogen peroxide with sodium carbonate alone or in the presence of a stabilizer either in batch or continuous processes. In contrast, sodium perborate has been prepared by reacting borax or boric acid with sodium hydroxide and hydrogen peroxide. Unfortunately, known methods for preparing sodium carbonate peroxide and sodium perborate do not provide a compound which is completely storage stable, that is, a compound which does not decompose and lose its active oxygen upon storage. Because the decomposition rate of sodium carbonate peroxide is substantially faster than that for sodium perborate, sodium carbonate peroxide has not found complete commercial acceptance even though it has a higher initial active oxygen content than sodium perborate.

Numerous stabilizing agents have been proposed to minimize the peroxygen decomposition rate, which stabilizers have been employed in two primary ways. The first involves preparing the peroxygen compound in the presence of a stabilizer. U.S. Pat. No. 3,860,694 discloses a process for stabilizing sodium carbonate peroxide by preparing sodium carbonate peroxide in the presence of a stabilizer selected from the group consisting of magnesium sulfate, magnesium silicate, magnesium chloride, magnesium fluorosilicate, magnesium oxide, and magnesium hydroxide, ethylene diaminetetraacetic acid, ethylene triaminepentaacetic acid and benzoic acid. U.S. Pat. No. 3,677,697 discloses preparing sodium carbonate peroxide in the presence of inorganic stabilizers and 1 to 3% by weight benzoic acid.

The second approach involves stabilizing a previously prepared peroxygen compound by either treating solutions containing the peroxygen or by coating the peroxygen with a stabilizer. U.S. Pat. No. 3,766,078 discloses stabilizing aqueous solutions of peroxygen compounds containing an alkali metal silicate with a synergistic stabilizing agent comprising nitrilotriacetic acid, 1-dihydroxyethylidene-1,1-diphosphonic acid and a water-soluble magnesium or calcium salt. British Pat. No. 1,398,876 discloses coating a solid peroxygen with the condensation product of at least one long chain fatty acid and a poly(alkylene glycol) or a poly(alkylene glycol) terminally substituted by one or two amine groups.

Even though all of the aforementioned processes have been effective in partially increasing the storage stability of peroxygen compounds, more effective stabilizers are necessary to increase the stability of peroxygen compounds to higher levels.

Applicant has unexpectedly discovered that the storage stability of a particulate peroxygen compound is significantly improved by coating the particulate peroxygen compound with specific polyethylene glycol. More particularly, Applicant has discovered that a particulate peroxygen compound selected from the group consisting of sodium carbonate peroxide, sodium perborate and mixtures thereof has improved storage stability when coated with about 0.1 to about 3.0 weight percent of a polyethylene glycol having an average molecular weight greater than about 200.

According to the invention, a particulate peroxygen compound, preferably, sodium carbonate peroxide, sodium perborate or mixtures thereof, is coated with a specific polyethylene glycol. The peroxygen compounds are prepared by conventional processes, which processes do not constitute a part of this invention.

The peroxygen compounds being coated should be substantially dry, that is, they should have from 0 to 0.2% residual moisture. Moisture contents up to 10% may be tolerated during the coating procedure if excess moisture above 1.0% is removed by drying the coated product prior to storage. These small amounts of moisture may be tolerated without subsequent decomposition of the peroxygen compounds.

Mixtures of sodium carbonate peroxide and sodium perborate may be prepared by conventional techniques. Such mixtures may be employed in weight ratios of 1:99 to 99:1 respectively and are preferably employed in weight ratios of between 1:1 to 1:2 sodium carbonate peroxide to sodium perborate.

The polyethylene glycols employed in the process of the invention must have average molecular weights greater than about 200 and preferably greater than 300 and exist in a fluid or viscous state. Polyethylene glycols having average molecular weights below about 200 do not provide sufficient storage stability. Solid polyethylene glycols may also be employed provided they are melted into a fluid or viscous state for coating the peroxygen compound or solubilized in a solvent which is inert to the peroxygen compound to be coated. Thus, polyethylene glycols having average molecular weights of 1,500 to 6,000 or more may be utilized in the process of this invention.

The peroxygen compound is preferably coated with about 0.1 to about 3.0 weight percent of the polyethylene glycol and most preferably with about 0.5 to about 2.0 weight percent. Amounts substantially less than 0.1 weight percent are not efficient in stabilizing the peroxygen compounds, and amounts greater than 3.0 weight percent may result in caking of the peroxygen compounds.

The polyethylene glycol may be applied to the peroxygen compound by conventional techniques. One method involves pouring or spraying the polyethylene glycol onto a bed of the peroxygen compound while it is mechanically agitated. Alternatively, the polyethylene glycol may be sprayed onto peroxygen compound as it is being agitated in a fluidized bed, which bed may be heated or unheated. Alternatively, the polyethylene glycol may be dissolved in a solvent, inert to the peroxygen compound being coated and preferably having low volatility, and sprayed onto the peroxygen compound particles agitated in a fluidized bed, the bed being supplied with sufficient hot air to evaporate the solvent. Suitable solvents include water, alcohol, dimethyl formamide, tetrahydrofuran and the like.

The stabilized peroxygen compounds prepared according to the invention retain at least 85% of their original active oxygen content after five days when subjected to a temperature of 120° F. and 90% relative humidity. This high storage stability may make it possible to ship and store the stabilized peroxygen material in bulk, which heretofore has not been feasible, and renders the peroxygen compounds more acceptable as a formulation component.

The following examples are given to illustrate the invention. All percentages given are based upon weight unless otherwise indicated.

EXAMPLE 1

Inventive Runs 1, 2 and 3

Comparative Runs A, B, C, D and E

A conventionally prepared dry sodium carbonate peroxide product was coated with various additives by adding 0.1 gram of polyethylene glycol additive to 10 grams of sodium carbonate peroxide in a 250 ml beaker. The mixture was stirred manually until it was uniformly blended. The active oxygen content of the product was then analyzed.

Storage stability of the peroxygen compound was measured by placing 1 gram of the coated material in a 250 ml Erlenmeyer flask covered with a water vapor-permeable membrane (kraft paper coated with polyethylene). The sample was then placed in a cabinet maintained at a temperature of 120° F. and at 90% relative humidity for 5 days whereupon the material was again analyzed for active oxygen content. Results are set forth in Table I.

In Run 1, Carbowax 300 was employed as the polyethylene glycol having an average molecular weight of 300. Carbowax is the brandname of polyethylene glycols marketed by Union Carbide Corporation. In Run 2, Carbowax 600 was employed as the polyethylene glycol having an average molecular weight of 600. In Run 3, Carbowax 1500 was employed as the polyethylene glycol having an average molecular weight of 1500. In Run 3, the solid polyethylene glycol was melted at a temperature of 45° C., and then the viscous material was permitted to cool to room temperature whereupon it was mixed with the sodium carbonate peroxide. With these additives in Runs 1 to 3, the stabilized percabonate compounds retained approximately 90% of their active oxygen content after the five day stability test.

In Comparative Run A, the sodium carbonate peroxide product was not coated with any additive. Note that without any additive, only 60% of the original active oxygen content of the percarbonate material remained after the five day stability test.

In Comparative Run B, 1,2 propanediol was employed as the additive and only 55% of the original active oxygen remained after the five day stability test.

In Comparative Run C, a low molecular weight polyethylene glycol, namely, triethylene glycol which has a molecular weight below 200, was employed as the additive. This additive was completely inadequate in providing satisfactory stabilization.

In Comparative Run D, a polypropylene glycol was employed as the additive, and only 72% of the original active oxygen remained after the five day stability test.

In Comparative Run E, Hyonic FA 40, a fatty alkanolamide marketed by Nopco Chemical Company, was employed as the additive, this compound being one of the compounds recited in British Pat. No. 1,398,876. After the five day stability test, only 66% of the original active oxygen remained in the percarbonate material treated with this additive.

EXAMPLE 2

Inventive Runs 4, 5 and 6

Comparative Run F

The procedure of Example 1 was repeated except that polyethylene glycol having an average molecular weight of 300 was employed in varying concentrations between 0.1 to 1.0% with sodium carbonate peroxide and sodium perborate tetrahydrate as the peroxygen compound. The results are set forth in Table II and indicate that the best stability was obtained at the highest level of stabilizer employed.

EXAMPLE 3

Inventive Run 7

Comparative Run G

The procedure of Example 1 was repeated except that polyethylene glycol having an average molecular weight of 300 was added to a mixture containing 6 grams sodium perborate tetrahydrate and 4 grams sodium carbonate peroxide. As is evident from the results listed in Table III, a mixture of sodium carbonate peroxide and sodium perborate tetrahydrate coated with a polyethylene glycol stabilizing agent (Run 7) provides good stability as measured by active oxygen content after the five day stability test, when compared to the same mixture (Run G) which has not been coated with polyethylene glycol in the process of this invention.

The invention being thus described, it will be obvious that the same may be varied in many ways. Such variations are not to be regarded as a departure from the spirit and scope of the invention and all such modifications are intended to be included within the scope of the following claims.

TABLE 1

| Run # | Coating Agent | Initial Active Oxygen Content, % | Final Active Oxygen Content, % | Percent of Initial Active Oxygen Remaining |
|---|---|---|---|---|
| Inventive | | | | |
| Run 1 | Polyethylene glycol 300 mol. wt. | 13.40 | 12.06 | 90% |
| Run 2 | Polyethylene glycol 600 mol. wt. | 13.40 | 11.94 | 89% |
| Run 3 | Polyethylene glycol 1500 mol. wt. | 13.40 | 12.06 | 90% |
| Comparative | | | | |
| Run A | None | 13.54 | 8.12 | 60% |
| Run B | 1,2 propanediol 76 mol. wt. | 13.40 | 7.37 | 55% |

TABLE 1-continued

| Run # | Coating Agent | Initial Active Oxygen Content, % | Final Active Oxygen Content, % | Percent of Initial Active Oxygen Remaining |
| --- | --- | --- | --- | --- |
| Run C | triethylene glycol 150 mol. wt. | 13.40 | 8.17 | 61% |
| Run D | polypropylene glycol 425 mol. wt. | 13.40 | 9.66 | 72% |
| Run E | fatty alkanolamide | 13.40 | 8.88 | 66% |

TABLE II

| | | Sodium Perborate Tetrahydrate | | | Sodium Carbonate Peroxide | | |
| --- | --- | --- | --- | --- | --- | --- | --- |
| Run # | Stabilizer Concentration | Initial A.O.* Content, % | Final A.O.* Content, % | Percent of Initial A.O.* Remaining | Initial A.O.* Content, % | Final A.O.* Content, % | Percent of Initial A.O.* Remaining |
| Comparative Run F | 0 | 10.53 | 7.54 | 72% | 12.73 | 8.74 | 69% |
| Inventive Run 4 | 0.1 | 10.52 | 8.53 | 81% | 12.72 | 10.42 | 82% |
| Run 5 | 0.5 | 10.48 | 9.64 | 92% | 12.67 | 10.74 | 85% |
| Run 6 | 1.0 | 10.42 | 9.88 | 95% | 12.60 | 11.09 | 88% |

*Active Oxygen

TABLE III

| Run # | Initial Active Oxygen Content | Final Active Oxygen Content | Percent of Initial A.O.* Remaining |
| --- | --- | --- | --- |
| Comparative Run G | 11.94 | 9.53 | 80% |
| Inventive Run 7 | 11.82 | 11.05 | 94% |

*Active Oxygen

What is claimed is:

1. In a process in which a particulate peroxygen compound, selected from the group consisting of sodium carbonate peroxide, sodium perborate and mixtures thereof, is coated with a stabilizing agent, the improvement which comprises mixing the particulate peroxygen with about 0.1 to about 3.0 weight percent of a polyethylene glycol having an average molecular weight of from 300 to 1,500 and recovering a stabilized, polyethylene glycol-coated peroxygen compound.

2. In the process of claim 1 wherein the particulate peroxygen is coated with 0.5 to 2.0 weight percent of said polyethylene glycol.

3. The process of claim 1 wherein the particulate peroxygen is a mixture of sodium carbonate peroxide and sodium perborate in a weight ratio of 1:1 to 1:2.

* * * * *